United States Patent [19]
Lee

[11] Patent Number: 5,904,633
[45] Date of Patent: May 18, 1999

[54] CONTINUOUSLY VARIABLE TRANSMISSION

[75] Inventor: Yong-Jun Lee, Seoul, Rep. of Korea

[73] Assignee: Hyundai Motor Co., Ltd., Seoul, Rep. of Korea

[21] Appl. No.: 08/774,639

[22] Filed: Dec. 30, 1996

[30] Foreign Application Priority Data

Dec. 30, 1995 [KR] Rep. of Korea ............... 95-68247
Dec. 30, 1995 [KR] Rep. of Korea ............... 95-68248
Dec. 30, 1995 [KR] Rep. of Korea ............... 95-68249

[51] Int. Cl.$^6$ .................................................. F16H 37/08
[52] U.S. Cl. ........................ 475/210; 475/211; 475/214
[58] Field of Search .......................... 475/207–214, 475/66; 474/11, 73, 69

[56] References Cited

U.S. PATENT DOCUMENTS

| | | | |
|---|---|---|---|
| 3,340,749 | 9/1967 | Magg et al. | 475/211 |
| 4,290,320 | 9/1981 | Abbott | 475/66 |
| 4,304,150 | 12/1981 | Lupo et al. | 474/73 X |
| 4,589,303 | 5/1986 | Roberts | 475/211 |
| 4,608,885 | 9/1986 | Kovunen | 475/210 |
| 4,624,153 | 11/1986 | Itoh et al. | 475/211 |
| 4,644,820 | 2/1987 | Macey et al. | 475/211 |
| 4,740,191 | 4/1988 | Takano et al. | 474/11 X |
| 5,690,576 | 11/1997 | Moroto et al. | 475/211 |
| 5,720,686 | 2/1998 | Yan et al. | 475/211 |

FOREIGN PATENT DOCUMENTS

| | | | |
|---|---|---|---|
| 0198534 | 10/1986 | European Pat. Off. | |
| 3543635 | 6/1986 | Germany | 475/211 |
| 94021941 | 9/1994 | WIPO | 475/211 |

*Primary Examiner*—Khol Q. Ta

[57] ABSTRACT

The continuously variable transmission (CVT) includes an input shaft delivering power from an engine, an output shaft having a first drive member, and a secondary shaft having a first driven member operationally connected with the first drive member. The CVT further includes a pulley member transferring power from the input shaft to the secondary shaft. The pulley member includes a drive pulley and a driven pulley operationally connected to the drive pulley. The pulley member forms a first power pathway for communicating the engine power from the input shaft to the output shaft via the secondary shaft. The CVT also includes a power by-pass member for selectively supplying power from the input shaft directly to the output shaft to form a second power pathway for communicating the engine power from the input shaft directly to the output shaft which by-passes the first power pathway.

8 Claims, 6 Drawing Sheets

CONTINUOUSLY VARIABLE TRANSMISSION

BACKGROUND OF THE INVENTION

1. Field of the Invention

The present invention relates to a continuously variable transmission; and more particularly, to a continuously variable transmission having a main power pathway including the pulley member of the continuously variable transmission (CVT) and a second power pathway which by-passes the main power pathway and does not include the pulley member.

2. Description of Related Art

FIG. 1 illustrates a prior art CVT 1. As shown in FIG. 1, a torque convertor 4 transfers the power output from an engine 2 to an input shaft 6. A planetary gear unit 8 is connected to the input shaft 6 and to a secondary input shaft 6A.

The planetary gear unit 8 includes double pinion gears 11, a sun gear 12 in a gearing relationship with an inner one of the double pinion gears 11, a planetary carrier 10 for the double pinion gears 11, and a ring gear 16 in a gearing relationship with the outer one of the double pinion gears 11. The sun gear 12 is mounted on the secondary input shaft 6A. The planetary carrier 10 is connected to the input shaft 6, and a first friction element 24 selectively connects the planetary carrier 10 to the secondary input shaft 6A. A second friction element 18 selectively connects the ring gear 16 to the housing of the CVT 1.

A drive pulley 22 is mounted on the secondary input shaft 6A. The drive pulley 22 includes a fixed pulley member 34, and a movable drive pulley member 33.

The CVT 1 of FIG. 1 also includes a secondary shaft 30, an output shaft 40, and an output gear unit 53. The secondary shaft 30 includes a driven pulley 28 and a first gear 29 mounted thereon. The driven pulley 28 is operationally connected with the drive pulley 22 by a chain 26. The drive pulley 22, the chain 26 and the drive pulley 28 form a pulley member 21 of the CVT 1.

The output shaft 40 includes a second gear 42 and a third gear 44. The second gear 42 is in a gearing relationship with the first gear 29 to transfer power from the secondary shaft 30 to the output shaft 40.

The output gear unit 53 includes a gear train portion 70 and a differential unit 71. The gear train portion 70 is in a gearing relationship with the third gear 44 and the differential unit 71 to transfer power from the output shaft 40 to the differential unit 71. The differential 71 then transfers power to the driving wheels (not shown).

When operating in reverse, the second friction element 18 is engaged, while the first friction element 24 is disengaged. This causes the secondary input shaft 6A to rotate in the opposite direction in which the input shaft 6 rotates. The power from the engine is transferred from the input shaft 6 to the input shaft 6A via the planetary gear unit 8, from the secondary input shaft 6A to the secondary shaft 30 via the pulley member 21, from the secondary shaft 30 to the output shaft 40 via the first and second gears 29 and 42 and from the output shaft 40 to the differential unit 71 via the third gear 44 and the gear train portion 70.

When operating in the forward direction, the first friction element 24 is engaged, while the second friction element 18 is disengaged. The power is then transferred as discussed above with respect to operation in reverse.

Because the prior art CVT of FIG. 1 utilizes a planetary gear unit 8, the construction of the CVT is quite complex and costly.

European Patent Application 198,534 to Van der Veen discloses a CVT which simplifies the CVT structure by eliminating the need for a planetary gear unit. Additionally, EPO 198,534 discloses that the use of a secondary shaft, such as secondary shaft 30 in FIG. 1, increases the size of the CVT, and discloses a CVT which eliminates the use of a secondary shaft. FIG. 2 illustrates the CVT of EPO 198,534.

As shown in FIG. 2, a torque convertor 4 transfers the power output from an engine 2 to an input shaft 6. The input shaft 6 includes a fourth gear 106 fixedly mounted thereon and a drive pulley 100 freely rotatably mounted thereon. Freely rotatably mounted means that even though the drive pulley 100 is mounted on the input shaft 6, the drive pulley 100 does not rotate when the input shaft 6 rotates unless a third friction element 114 connects the drive pulley 100 to the input shaft 6.

The CVT of EPO application 198,534 also includes an output shaft 40, but no secondary shaft. The output shaft 40 includes a sixth gear 110 freely rotatably mounted thereon. The sixth gear 110 is in a gearing relationship with a fifth gear 108, and the fifth gear 108 is in a gearing relationship with the fourth gear 106. A fourth friction element 112 selectively operationally connects the sixth gear 110 to the output shaft 40.

The output shaft 40 further includes a first sprocket 116 and a driven pulley 102 mounted thereon. The driven pulley 102 is operationally connected to the drive pulley 100 via a chain 104. The drive pulley 100, the chain 104 and the driven pulley 102 form a pulley member 121 of the CVT.

The CVT further includes an output gear unit 53 which includes a differential unit 71 and a gear train portion 70. The gear train portion 70 includes a secondary sprocket 120 operationally connected to the first sprocket 116 by a chain 118.

In operation, the power from the engine can be transferred from the input shaft 6 to the output shaft 40 by engaging the fourth friction element 112 and disengaging the third friction element 114. Power then is transferred from the input shaft 6 to the output shaft 40 via the fourth, fifth and sixth gears 106, 108 and 110. Unlike the CVT of prior art FIG. 1, power from the engine will not be transferred to the output shaft via the pulley member 121.

A second alternate power pathway is created by engaging the third friction element 114 and disengaging the fourth friction element 112. In this instance, the power of the engine is transferred directly from the input shaft 6 to the output shaft 40 via the pulley member 121.

When by-passing the pulley member 121, the EPO application 198,534 uses fourth, fifth and sixth gears 106, 108 and 110. The use of multiple gears to transfer power between rotatable shafts has two disadvantages. First, the use of many gears results in a large amount of noise being generated. Second, gear elements do not absorb vibrations very well; and consequently, any shock experienced by the transmission will be readily transferred by the gear arrangement.

SUMMARY OF THE INVENTION

One object of the present invention is to overcome the disadvantages discussed above with respect to the prior art.

Another object of the present invention is to provide a CVT which eliminates the use of a planetary gear unit.

A further object of the present invention is to provide a CVT having reduced noise and shock transference features.

These and other objects of the present invention are achieved by providing a continuously variable transmission, comprising: an input shaft delivering power from an engine; an output shaft having a first drive member; a secondary shaft having a first driven member operationally connected with said first drive member; a pulley member transferring power from said input shaft to said secondary shaft, said pulley member including a drive pulley and a driven pulley operationally connected to said drive pulley, said pulley member forming a first power pathway from communicating said engine power from said input shaft to said output shaft via said secondary shaft; and power by-pass means for selectively supplying power from said input shaft directly to said output shaft to form a second power pathway for communicating said engine power from said input shaft directly to said output shaft which by-passes said first power pathway.

The objects of the present invention are further achieved by providing a continuously variable transmission, comprising: an input shaft delivering power from an engine; an output shaft having a first drive member; a secondary shaft having a first driven member operationally connected with said first drive member; a first power transfer unit transferring power from said input shaft directly to said output shaft, said first power transfer unit including a second drive member and a second drive member, said second drive member being operationally connected to said second driven member and freely rotatably mounted to said input shaft, and said second driven member being fixed to said output shaft; a pulley member transferring power from said input shaft to said secondary shaft, said pulley member including a drive pulley operationally connected to a driven pulley, said drive pulley being fixed to said input shaft, and said driven pulley being freely rotatably mounted to said secondary shaft; a first friction element for selectively operationally connecting said second drive member to said input shaft; and a second friction element for selectively operationally connecting said driven pulley to said secondary shaft.

The objects of the present invention are additionally achieved by providing a continuously variable transmission, comprising: an input shaft delivering power from an engine; an output shaft having a first drive member; a secondary shaft having a first driven member operationally connected with said first drive member; a first power transfer unit transferring power from said input shaft directly to said output shaft, said first power transfer unit including a second drive member and a second driven member, said second drive member being operationally connected to said second driven member and freely rotatably mounted to said input shaft, and said second driven member being fixed to said output shaft; a pulley member transferring power from said input shaft to said secondary shaft, said pulley member including a drive pulley operationally connected to a driven pulley, said drive pulley being freely rotatably mounted to said input shaft, and said driven pulley being fixed to said secondary shaft; a first friction element for selectively operationally connecting said second drive member to said input shaft; and a second friction element for selectively operationally connecting said drive pulley to said input shaft.

The objects of the present invention are also achieved by providing a continuously variable transmission, comprising: an input shaft delivering power from an engine; an output shaft having a first drive member; a secondary shaft having a first driven member operationally connected with said first drive member; a first power transfer unit transferring power from said input shaft directly to said output shaft, said first power transfer unit including a second drive member and a second driven member, said second drive member being operationally connected to said second driven member and fixed to said input shaft, and said second driven member being freely rotatably mounted to said output shaft; a pulley member transferring power from said input shaft to said secondary shaft, said pulley member including a drive pulley operationally connected to a driven pulley, said drive pulley being freely rotatably mounted to said input shaft, and said driven pulley being fixed to said secondary shaft; a first friction element for selectively operationally connecting one said second driven member to said output shaft; and a second friction element for selectively operationally connecting said drive pulley to said input shaft.

The objects of the present invention are further achieved by providing a continuously variable transmission, comprising: an output shaft having a first drive member; a secondary shaft having a first driven member operationally connected with said first drive member; a first power transfer unit transferring power from said input shaft directly to said output shaft, said first power transfer unit including a second drive member and a second driven member, said second drive member being operationally connected to said second driven member and fixed to said input shaft, and said second driven member being freely rotatably mounted to said output shaft; a pulley member transferring power from said input shaft to said secondary shaft, said pulley member including a drive pulley operationally connected to a driven pulley, said drive pulley being rotatably mounted to said secondary shaft; a first friction element for selectively operationally connecting one said second driven member to said output shaft; and a second friction element for selectively operationally connecting said driven pulley to said secondary shaft.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
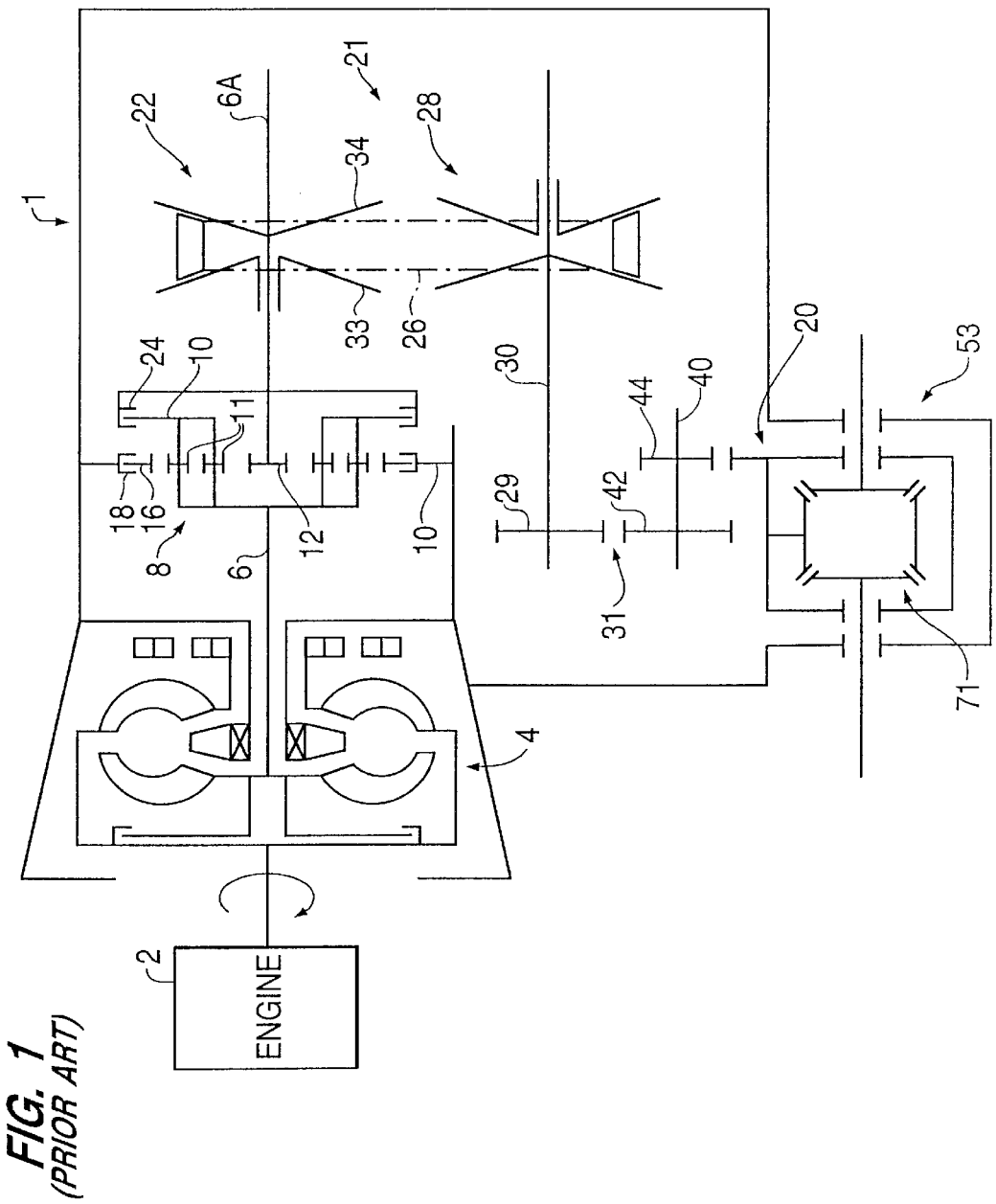
FIG. 1 illustrates a prior art CVT.
Figure 2:
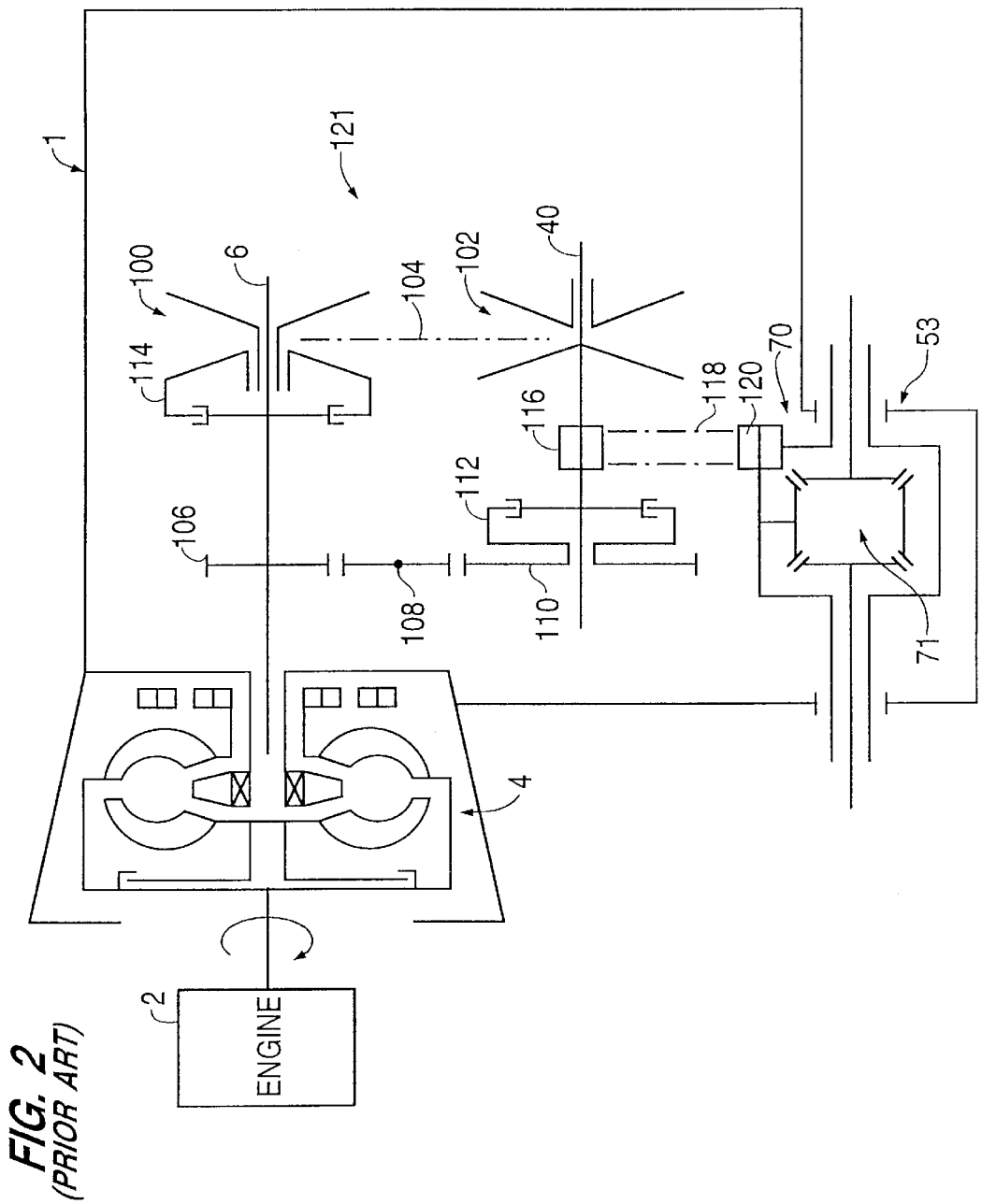
FIG. 2 illustrates another prior art CVT.
Figure 3:
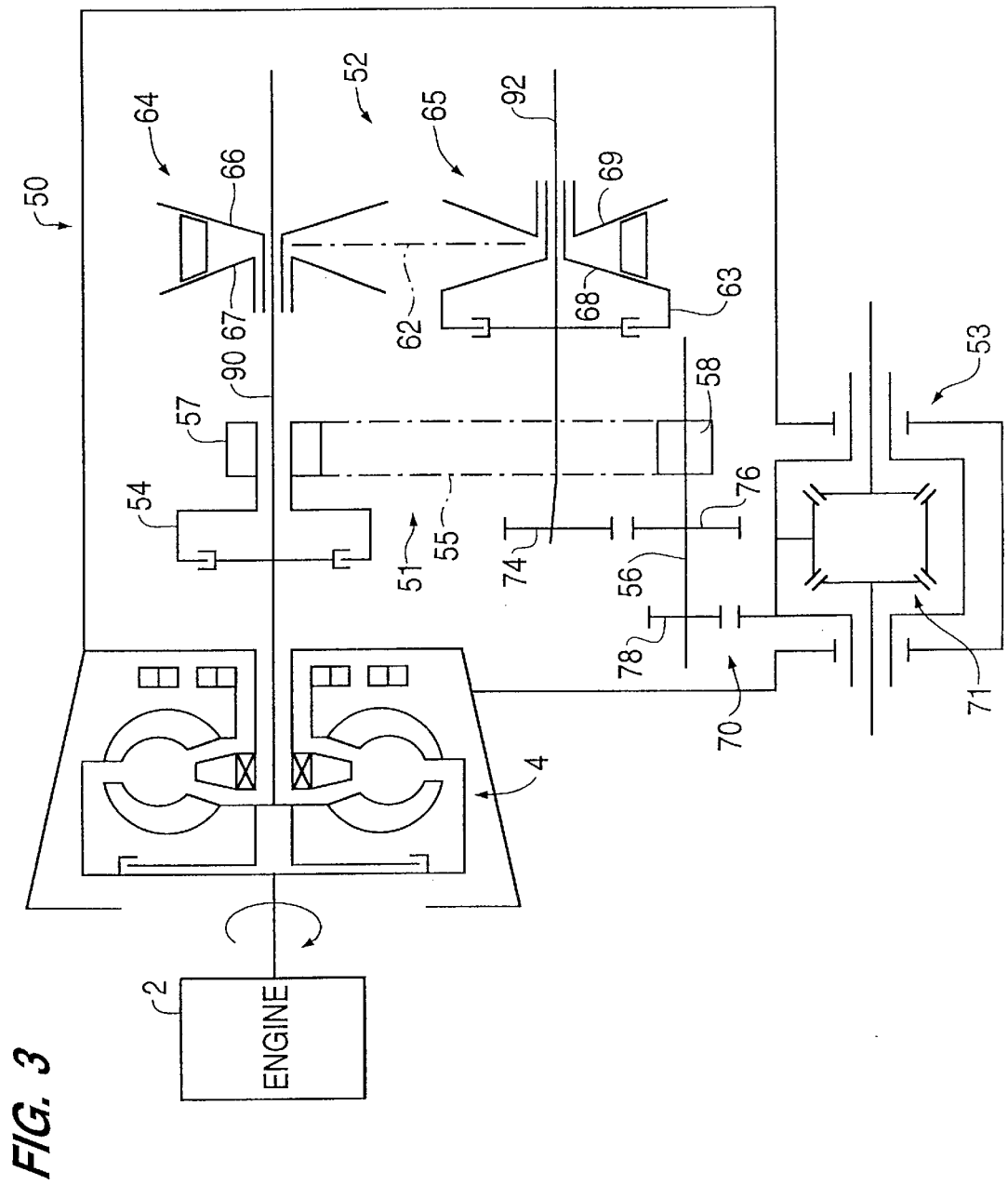
FIG. 3 illustrates a CVT according to a first embodiment of the present invention.

FIG. 3 illustrates a CVT 50 according to a first embodiment of the present invention. As shown in FIG. 3, a torque convertor 4 transfers power from an engine 2 to an input shaft 90. Input shaft 90 includes drive sprocket 57 freely rotatably mounted thereon and a drive pulley 64 fixedly mounted thereon. The drive pulley 64 includes a fixed drive pulley member 66 and a movable drive pulley member 67. A fifth friction element 54 selectively connects the drive sprocket 57 to the input shaft 90.

The CVT 50 further includes a secondary shaft 92 and an output shaft 56. The secondary shaft 92 includes a seventh gear 74 fixedly mounted thereon and a driven pulley 65 freely rotatably mounted thereon. The driven pulley 65 includes a fixed driven pulley member 68 and a movable driven pulley member 69. The driven pulley 65 is operationally connected to the drive pulley 64 via a chain 62. The drive pulley 64, chain 62, and driven pulley 65 form a pulley member 52 of the CVT 50. A sixth friction element 63 selectively connects the driven pulley 65 to the secondary shaft 92.

The output shaft 56 includes a driven sprocket 58, an eighth gear 76, and a ninth gear 78 fixedly mounted thereto. The driven sprocket 58 is operationally connected to the drive sprocket 57 via a chain 55. The eighth gear 76 is in a gearing relationship with the seventh gear 74.

The CVT 50 further includes an output gear unit 53. The output gear unit 53 includes a differential unit 71 and a gear train portion 70 operationally connected thereto. The gear train portion 70 is further in a gearing relationship with the ninth gear 78.

The operation of the CVT 50 illustrated in FIG. 3 will now be described. When operating in reverse, a first power pathway to the differential unit 71 from the engine 2 is created via the drive sprocket member 57, the chain 55, and the driven sprocket 58 by engaging the fifth friction element 54 and disengaging the sixth friction element 63. This causes the engine power to be transferred from the input shaft 90 directly to the output shaft 56, and then the power from the output shaft 56 is transferred to the differential unit 71 via the ninth gear 78 and the gear train portion 70.

When operating in the forward direction, a second power pathway is created via the drive pulley 64, the chain 62, and the driven pulley 65 by engaging the sixth friction element 63 and disengaging the fifth friction element 54. In this instance, the pulley member 52 transfers the engine power from the input shaft 90 to the secondary shaft 92. The engine power is then transferred to the output shaft 56 from the secondary shaft 92 via the seventh gear 74 and the eighth gear 76. The power is transferred from the output shaft 56 to the differential unit 71 via the ninth gear 78 and the gear train portion 70.

As FIG. 3 shows, the CVT 50 according to the first embodiment of the present invention eliminates the need for a planetary gear unit as used in the prior art CVTs. In contrast to the teachings of EPO application 198,534, the present invention employs a secondary shaft 92 for transferring power via the pulley member 52 in the forward direction. Furthermore, the CVT according to the present invention by-passes the pulley member when operating in reverse using a sprocket and chain arrangement. Unlike the gear arrangement of EPO 198,534, a sprocket and chain arrangement generates much less noise, and actually dampens vibrations transmitted to the transmission.

Figure 4:
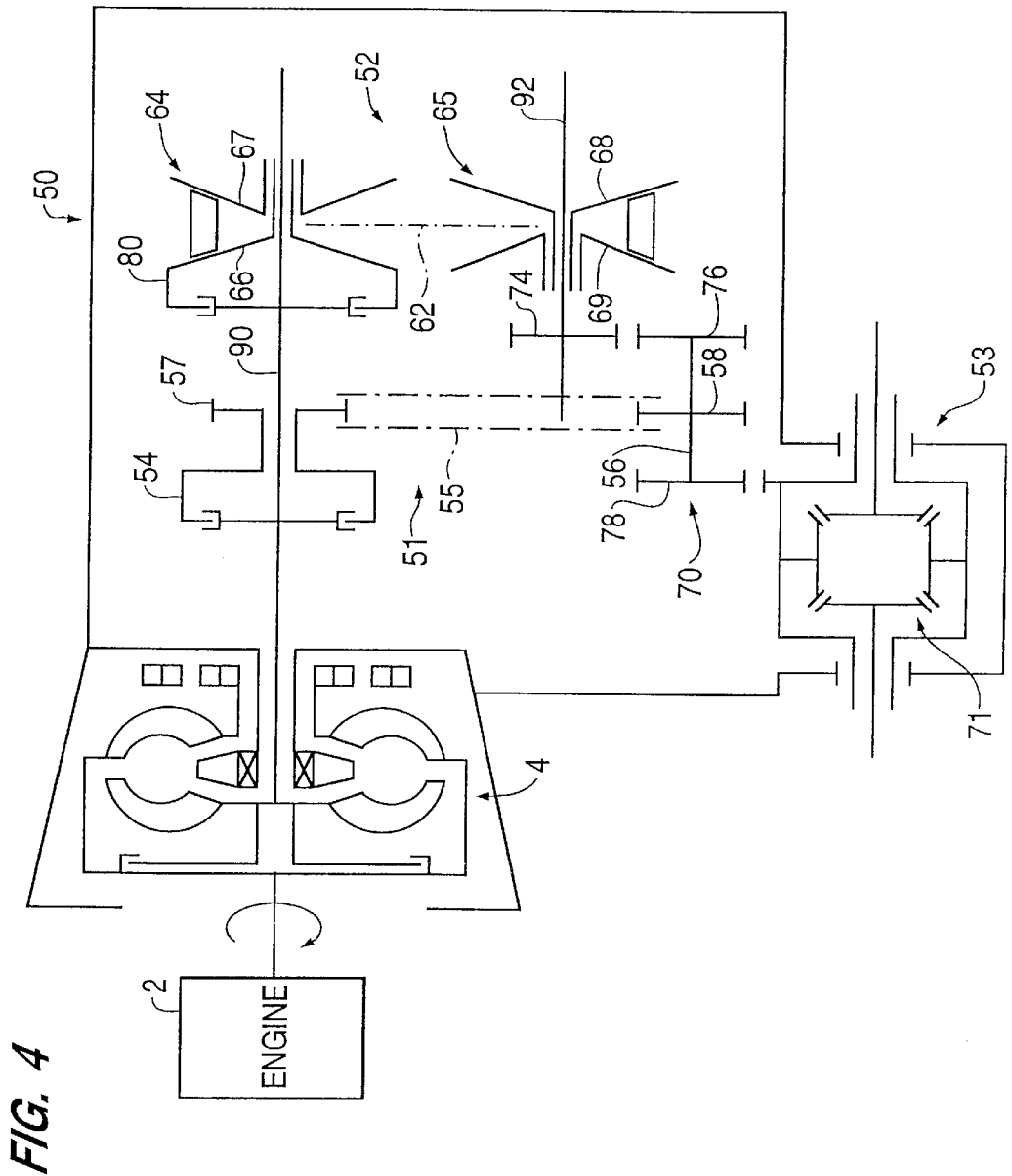
FIG. 4 illustrates a CVT according to a second embodiment of the present invention.

The second embodiment of the present invention will now be discussed. The second embodiment of the present invention is illustrated in FIG. 4. The second embodiment of the present invention is substantially similar to the first embodiment of the present invention except that the drive pulley 64 is freely rotatably mounted to the input shaft 90, and the driven pulley 65 is fixedly mounted to the secondary shaft 92. Furthermore, the second embodiment of the present invention does not include a sixth friction element 63. Instead, the second embodiment of the present invention includes a seventh friction element 80 which selectively operationally connects the drive pulley 64 to the input shaft 90. Because the remainder of the second embodiment is the same as that of the first embodiment, the remainder of the second embodiment will not be discussed in detail.

The operation of the CVT 50 illustrated in FIG. 3 will now be described. When operating in reverse, a first power pathway to the differential unit 71 from the engine 2 is created via the drive sprocket 57, chain 55, and the driven sprocket 58 by engaging the fifth friction element 54 and disengaging the seventh friction element 80. This causes the engine power to be transferred from the input shaft 90 directly to the output shaft 56, and then the power from the output shaft 56 is transferred to the differential unit 71 via the ninth gear 78 and the gear train portion 70.

When operating in the forward direction, a second power pathway is created via the drive pulley 64, the chain 62, and the driven pulley 65 by engaging the sventh friction element 80 and disengaging the sixth friction element 54. In this instance, the pulley member 52 transfers the engine power from the input shaft 90 to the secondary shaft 92. The engine power is then transferred from the secondary shaft 92 to the output shaft 56 via the seventh gear 74 and the eighth gear 76. The power is transferred from the output shaft 56 to the differential unit 71 via the ninth gear 78 and the gear train portion 70.

As FIG. 4 shows, the CVT 50 according to the second embodiment of the present invention eliminates the need for a planetary gear unit as used in the prior art CVTs. In contrast to the teachings of EPO application 198,534, the present invention employs a secondary shaft 92 for transferring power via the pulley member 52 in the forward direction. Furthermore, the CVT according to the present invention by-passes the pulley member when operating in reverse using a sprocket and chain arrangement. Unlike the gear arrangement of EPO 198,534, a sprocket and chain arrangement generates much less noise, and actually dampens vibrations transmitted to the transmission.

Figure 5:
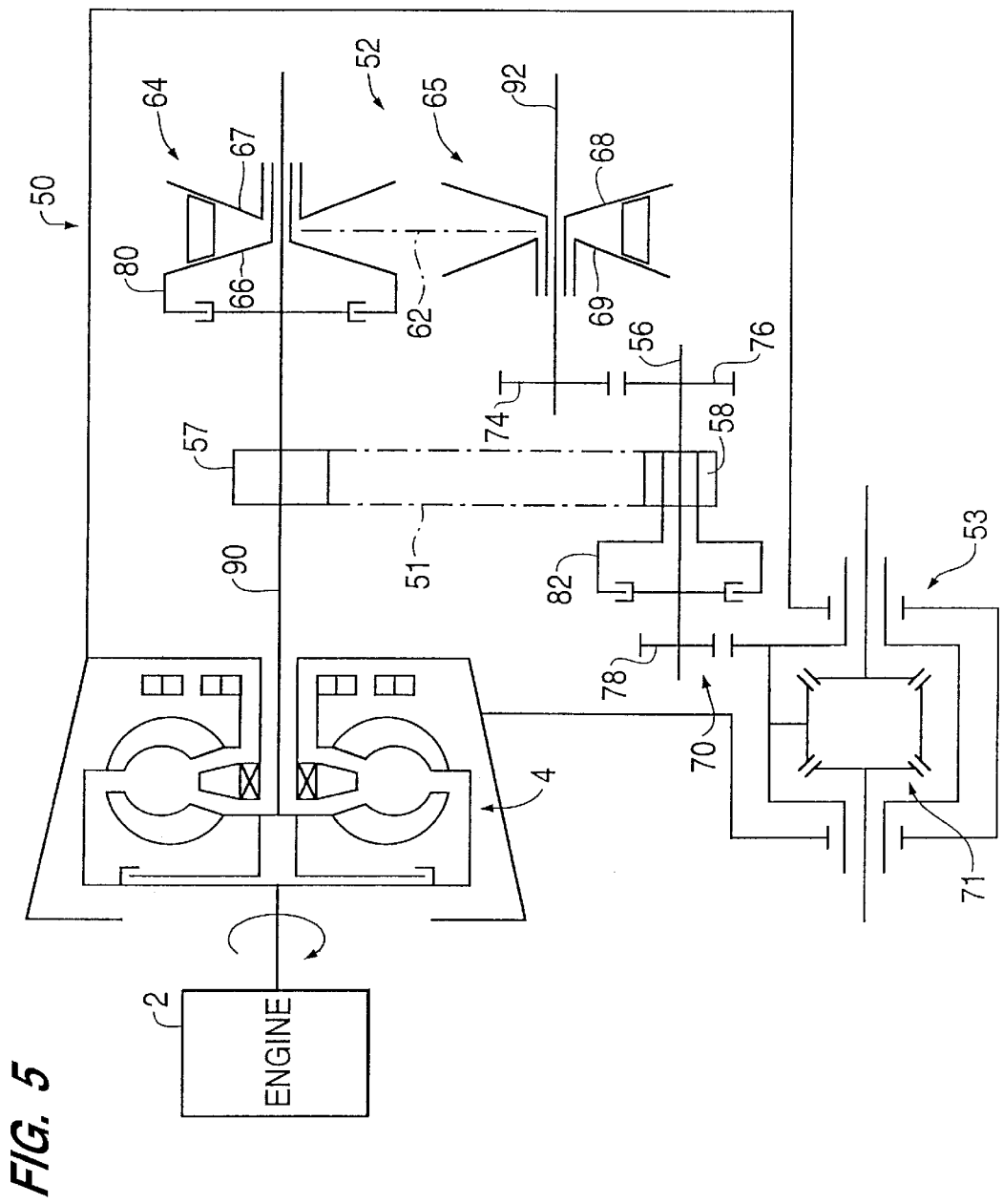
FIG. 5 illustrates a CVT according to a third embodiment of the present invention.

The third embodiment of the present invention will now be discussed. FIG. 5 illustrates the third embodiment of the present invention. The third embodiment is substantially similar to the second embodiment of the present invention. The third embodiment of the present invention differs from the second embodiment in that the drive sprocket 57 is fixedly mounted to the input shaft 90, and the driven sprocket 58 is freely rotatably mounted to the output shaft 56. Furthermore, the CVT 50 of the third embodiment does not include a fifth friction element 54, and instead includes an eighth friction element 82 which selectively operationally connects the driven sprocket 58 to the output shaft 56.

The remainder of the third embodiment of the present invention is the same as the second embodiment of the present invention, and therefore will not be described in detail.

The operation of the CVT 50 illustrated in FIG. 5 will now be described. When operating in reverse, a first power pathway to the differential unit 71 from the engine 2 is created via the drive member 57, chain 55, and the driven member 58 by engaging the eighth friction element 82 and disengaging the seventh friction element 80. This causes the engine power to be transferred from the input shaft 90 directly to the output shaft 56, and then the power from the output shaft 56 is transferred to the differential unit 71 via the ninth gear 78 and the gear train portion 70.

When operating in the forward direction, a second power pathway is created via the drive pulley 64, the chain 62, and the driven pulley 65 by engaging the seventh friction element 80 and disengaging the eight friction element 82. In this instance, the pulley member 52 transfers the engine power from the input shaft 90 to the secondary shaft 92. The engine power is then transferred from the secondary shaft 92 to the output shaft 56 via the seventh gear 74 and the eighth gear 76. The power is transferred from the output shaft 56 to the differential unit 71 via the ninth gear 78 and the gear train portion 70.

As FIG. 3 shows, the CVT 50 according to the first embodiment of the present invention eliminates the need for a planetary gear unit as used in the prior art CVTs. In contrast to the teachings of EPO application 198,534, the present invention employs a secondary shaft 92 for transferring power via the pulley member 52 in the forward direction. Furthermore, the CVT according to the present invention by-passes the pulley member when operating in reverse using a sprocket and chain arrangement. Unlike the gear arrangement of EPO 198,534, a sprocket and chain arrangement generates much less noise, and actually dampens vibrations transmitted to the transmission.

Figure 6:
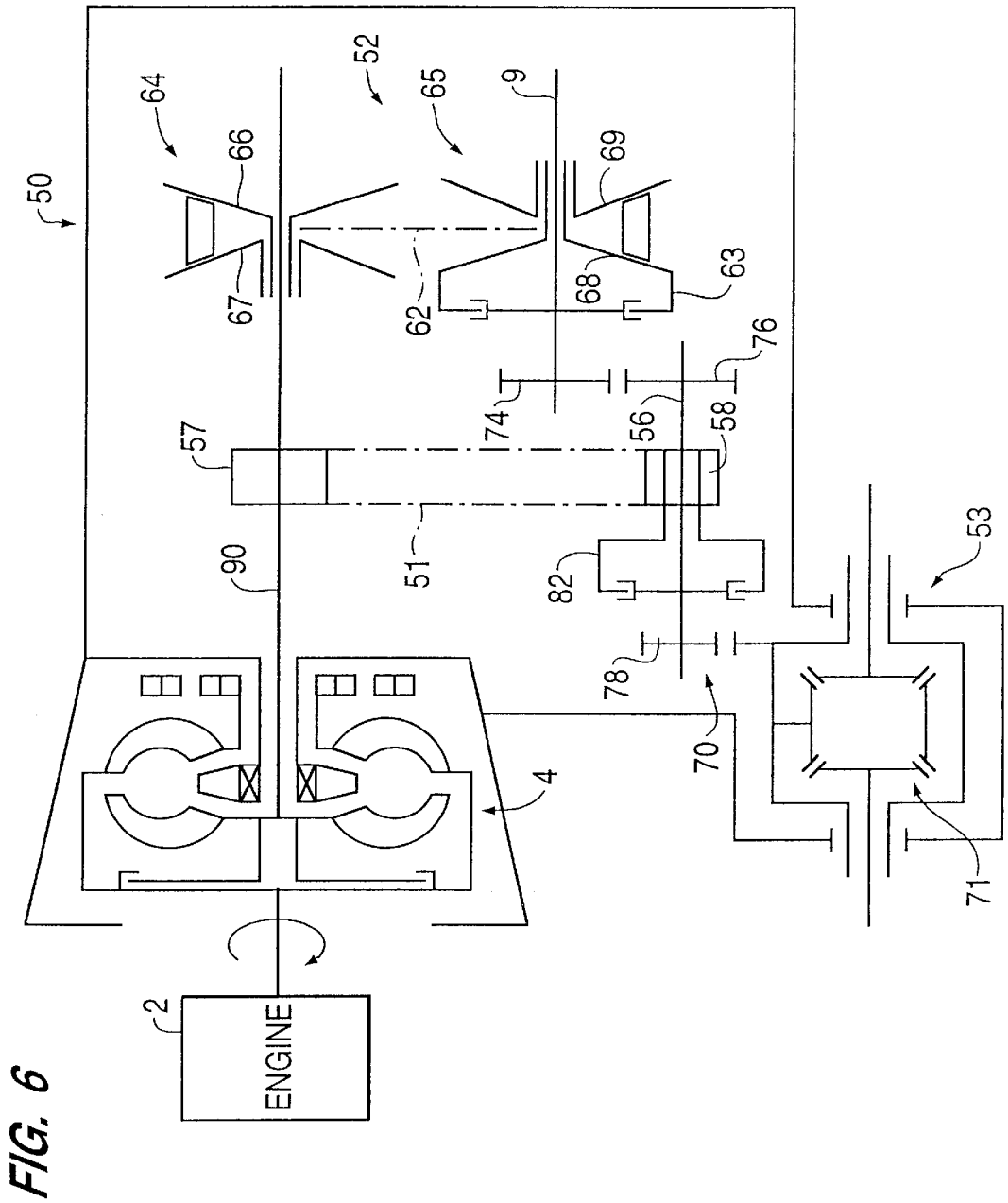
FIG. 6 illustrates a CVT according to a fourth embodiment of the present invention.

The fourth embodiment of the present invention will now be described. FIG. 6 illustrates the fourth embodiment of the present invention. The fourth embodiment of the present invention is substantially similar to the third embodiment of the present invention except that the drive pulley 64 is fixedly mounted to the input shaft 90, and the driven pulley 65 is freely rotatably mounted to the secondary shaft 92. Furthermore, the fourth embodiment of the present invention does not include a seventh frictional element 80, and includes a sixth frictional element 63 which selectively connects the driven pulley 65 to the secondary shaft 92.

The remainder of the fourth embodiment is the same as the third embodiment, and therefore, will not be described in detail.

The operation of the CVT 50 illustrated in FIG. 6 will now be described. When operating in reverse, a first power pathway from the engine 2 to the differential unit 71 is created via the drive sprocket 57, the chain 55, and the driven sprocket 58 by engaging the eighth friction element 82 and disengaging the sixth friction element 63. This causes the engine power to be transferred from the input shaft 90 directly to the output shaft 56, and then the power from the output shaft 56 is transferred to the differential unit 71 via the ninth gear 78 and the gear train portion 70.

When operating in the forward direction, a second power pathway is created via the drive pulley 64, the chain 62, and the driven pulley 65 by engaging the sixth friction element 63 and disengaging the eighth friction element 82. In this instance, the pulley member 52 transfers the engine power from the input shaft 90 to the secondary shaft 92. The engine power is then transferred from the secondary shaft 92 to the output shaft 56 via the seventh gear 74 and the eighth gear 76. The power is transferred from the output shaft 56 to the differential unit 71 via the ninth gear 78 and the gear train portion 70.

As FIG. 6 shows, the CVT 50 according to the fourth embodiment of the present invention eliminates the need for a planetary gear unit as used in the prior art CVTs. In contrast to the teachings of EPO application 198,534, the present invention employs a secondary shaft 92 for transferring power via the pulley member 52 in the forward direction. Furthermore, the CVT according to the present invention by-passes the pulley member when operating in reverse using a sprocket and chain arrangement. Unlike the gear arrangement of EPO 198,534, a sprocket and chain arrangement generates much less noise, and actually dampens vibrations transmitted to the transmission.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A continuously variable transmission comprising:
    an input shaft delivering power from an engine;
    an output shaft having a first drive member;
    a secondary shaft having a first driven member operationally connected with said first drive member;
    a pulley member transferring power from said input shaft to said secondary shaft, said pulley member including a drive pulley and a driven pulley operationally connected to said drive pulley, said pulley member forming a first power pathway for communicating said engine power from said input shaft to said output shaft via said secondary shaft;
    power by-pass means for selectively supplying power from said input shaft directly to said output shaft to form a second power pathway for communicating said engine power from said input shaft directly to said output shaft which by-passes said first power pathway, wherein:
    said drive pulley is fixed to said input shaft;
    said driven pulley is freely rotatably mounted to said secondary shaft; and
    said power by-pass means includes:
        a first power transfer unit transferring power from said input shaft directly to said output shaft, said first power transfer unit including a second drive member and a second driven member, said second drive member being operationally connected to said second driven member and freely rotatably mounted to said input shaft, and said second driven member being fixed to said output shaft,
        a first friction element for selectively operationally connecting said second drive member to said input shaft, and
        a second friction element for selectively operationally connecting said driven pulley to said secondary shaft.

2. The continuously variable transmission of claim 1, wherein said first power transfer unit includes a drive sprocket as said second drive member, a driven sprocket as said second driven member, and a chain operationally connecting said drive sprocket and said driven sprocket to transfer power from said drive sprocket to said driven sprocket.

3. The continuously variable transmission of claim 1, further comprising:
    a chain operationally connecting said drive pulley and said driven pulley to transfer power from said drive pulley to said driven pulley.

4. The continuously variable transmission of claim 1, further comprising:
    a differential gear operationally connected to said output shaft.

5. The continuously variable transmission of claim 1, wherein said output shaft rotates in a reverse direction when said first friction element operationally connects said second drive member to said input shaft, and said output shaft rotates in a forward direction, opposite said reverse direction, when said second friction element operationally connects said driven pulley to said secondary shaft.

6. The continuously variable transmission of claim 5, wherein said second drive member is not operationally connected to said input shaft when said driven pulley is operationally connected to said secondary shaft.

7. A continuously variable transmission comprising:

an input shaft delivering power from an engine;

an output shaft having a first drive member;

a secondary shaft having a first driven member operationally connected with said first drive member;

a pulley member transferring power from said input shaft to said secondary shaft, said pulley member including a drive pulley and a driven pulley operationally connected to said drive pulley, said pulley member forming a first power pathway for communicating said engine power form said input shaft to said output shaft via said secondary shaft;

power by-pass means for selectively supplying power from said input shaft directly to said output shaft to form a second power pathway for communicating said engine power from said input shaft directly to said output shaft which by-passes said first power pathway and said secondary shaft, wherein said drive pulley is freely rotatably mounted to said input shaft;

said driven pulley is fixed to said secondary shaft; and said power by-pass means includes,
a first power transfer unit transferring power from said input shaft directly to said output shaft, said first power transfer unit including a second drive member and a second driven member, said second drive member being operationally connected to said second driven member and fixed to said input shaft, and said second driven member being freely rotatably mounted to said output shaft,
a first friction element for selectively operationally connecting one said second driven member to said output shaft, and
a second friction element for selectively operationally connecting said drive pulley to said input shaft.

8. A continuously variable transmission comprising:

an input shaft delivering power from an engine;

an output shaft having a first drive member;

a secondary shaft having a first driven member operationally connected with said first drive member;

a pulley member transferring power from said input shaft to said secondary shaft, said pulley member including a drive pulley and a driven pulley operationally connected to said drive pulley, said pulley member forming a first power pathway for communicating said engine power form said input shaft to said output shaft via said secondary shaft;

power by-pass means for selectively supplying power from said input shaft directly to said output shaft to form a second power pathway for communicating said engine power from said input shaft directly to said output shaft which by-passes said first power pathway and said secondary shaft, wherein said driven pulley is freely rotatably mounted to said secondary shaft; and said drive pulley is fixed to said input shaft;

said power by-pass means includes,
a first power transfer unit transferring power from said input shaft directly to said output shaft, said first power transfer unit including a second drive member and a second driven member, said second drive member being operationally connected to said second driven member and fixed to said input shaft, and said second driven member being freely rotatably mounted to said output shaft,
a first friction element for selectively operationally connecting one said second driven member to said output shaft, and
a second friction element for selectively operationally connecting said driven pulley to said secondary shaft.

* * * * *